United States Patent [19]

Schultz

[11] Patent Number: 4,819,438

[45] Date of Patent: Apr. 11, 1989

[54] STEAM COOLED RICH-BURN COMBUSTOR LINER

[75] Inventor: Donald F. Schultz, Middleburg Hts., Ohio

[73] Assignee: United States of America, Washington, D.C.

[21] Appl. No.: 452,465

[22] Filed: Dec. 23, 1982

[51] Int. Cl.[4] .......... F02C 7/12; F02C 7/18

[52] U.S. Cl. .......... 60/730; 60/732; 165/83; 165/81; 165/156; 431/352

[58] Field of Search .......... 60/730, 732; 431/352; 165/82, 83, 156

[56] References Cited

U.S. PATENT DOCUMENTS

| | | | |
|---|---|---|---|
| 2,569,446 | 10/1951 | Bonvillian et al. | 60/39.32 |
| 2,728,192 | 12/1955 | Ross | 60/39.14 |
| 3,736,747 | 6/1973 | Warren | 60/730 X |
| 3,885,903 | 5/1975 | La Haye | 431/8 |
| 3,915,619 | 10/1975 | Quigg et al. | 431/10 |
| 4,228,848 | 10/1980 | Wadkinson, Jr. | 165/11 R |
| 4,265,615 | 5/1981 | Lohmann et al. | 431/353 |
| 4,266,600 | 5/1981 | Bieberbach | 165/76 |
| 4,411,308 | 10/1983 | Koerdt et al. | 165/70 |

OTHER PUBLICATIONS

H. R. Hazard, "$NO_x$ Emission from Experimental Compact Combustors", ASME 72-GT-105.

*Primary Examiner*—Randall L. Green

*Assistant Examiner*—Allen J. Flanigan

*Attorney, Agent, or Firm*—N.T. Musial

[57] ABSTRACT

An object of the invention is to cool a rich burn combustor without extracting excessive amounts of heat and to use the extracted heat. In accordance with the invention, a combustor (10) having a primary combustor (12) and a secondary combustor (13) with a throat (20) between them is provided with a jacket including a wall (27) radially outwardly of a wall (14) of the primary combustor (12). Steam is injected into a manifold (33) at the throat end of combustor (12) and flows in a plurality of spiral paths through the space between walls (14) and (27) to an outlet manifold (32) at the other end of combustor (12) becoming superheated. The superheated steam is employed to drive a stream utilization device. The spiral steam flow paths are established by barriers (38) wound in spiral fashion on the outside of wall (14) of the combustor (12). Another object is to minimize stress on the wall (14) of the primary combustor (12). Thus, the steam pressure in inlet manifold (33), is approximately the same as the combustor discharge pressure at throat (20) and annular expansion tubes (30) and (31) minimize stresses in the jacket comprised of walls (27), (28), and (29). The second combustor (13) accomplishes lean burning of the gases discharged from primary combustor (12). The combination of the rich burning of heavy fuels followed by lean burning minimizes the NOx in the exhaust gas discharged from combustor (13).

7 Claims, 2 Drawing Sheets

STEAM COOLED RICH-BURN COMBUSTOR LINER

ORIGIN OF THE INVENTION

The invention described herein was made by an employee of the United States Government and may be manufactured or used for governmental purposes without the payment of any royalties thereon or therefor.

DESCRIPTION

1. Technical Field

The invention relates to combustors for gas turbines and is directed more particularly to a combustor for burning heavy fuels or gas derived from coal gasification.

From the standpoint of energy conservation and cost savings, it is advantageous to use so-called heavy fuel in the operation of large, terrestrial gas turbines. An undesirable aspect of the use of heavy fuels in combustors is an excesssive amount of NOx contained in the exhaust discharge. The large amount of NOx results from the fact that heavy fuels contain large quantities of fuel bound nitrogen. In view of present day concerns regarding air pollution, the high NOx emissions of gas turbines utilizing heavy fuels are unacceptable.

2. Background Art

It is known in the prior art, that NOx emissions from a combustor can be significantly reduced by burning the fuel first with a lack of oxygen (rich burn) followed by one or more stages wherein the products of the rich burn stage are burned with excessive oxygen (lean burn).

The area of the combustor in which the rich burn process takes place is subjected to temperatures which drastically shorten its life because of deterioration of the combustor wall and because of thermal stresses. For an acceptably long life, with the materials presently available, the combustor wall temperature must be no higher than about 1100° to 1400° F. and preferably below 1200° F. Lower temperatures are also undesirable because they produce a cold wall effect which deleteriously affects the chemical kinetics of the combustion process.

Attempts to cool rich burn type combustors convectively by air or water have been attempted. Air has never been used successfully to maintain sufficiently low temperatures for satisfactory liner life while water cooling can result in as much as 10% of the heat energy being removed from the combustor. Because water is a low energy fluid, the heat which it extracts from the combustor cannot be used to provide additional work without numerous problems. Consequently, most of this extracted energy would be lost. Further, the rich burn concept inherently precludes the use of convective cooling, as for example by an air film, on the inner surface of the combustor wall.

In the prior art, U.S. Pat. No. 2,981,241 to Barton discloses a vapor generator having a vapor cooled wall comprising at least one bank of vapor cooled tubular members each having a loop portion which allows thermal expansion of the tubes.

U.S. Pat. No. 4,191,133 to Stevens discloses an upright furnace having a vapor generating section formed by a plurality of tubes, a portion of which extend at an angle with respect to the horizontal plane. The angularly extending portion of each tube has a rifled bore.

U.S. Pat. No. 4,244,327 to Ssinegurski discloses a steam generator wherein a minor portion of the steam flow passes up through a rear wall to a super heater inlet header at an intermediate elevation. The major portion of the flow passes up the front wall and through hanger tubes to a roof header, then across the roof and down the rear wall to the super heater inlet header at the intermediate elevation.

DISCLOSURE OF THE INVENTION

In accordance with the invention, there is disposed around a rich burn combustor a wall or jacket generally conforming to the shape of the combustor and having separate conical end portions. The end portions are joined to the main section of the jacket by respective annular expansion tubes which serve to relieve thermal stresses in the jacket.

Steam is directed into a manifold at the gas discharge end of the combustor and passes in a plurality of spiral paths between the combustor and the jacket to a steam outlet manifold from which it is discharged to steam utilization equipment. Thus, the heat extracted from the combustor is utilized to perform work.

The steam pressure at the inlet manifold is approximately the same as the discharge pressure of the combustor, thereby minimizing pressure differences and stresses on the combustor. The steam temperature is the saturation temperature for whatever pressure is used.

DESCRIPTION OF A PREFERRED EMBODIMENT

Figure 1:
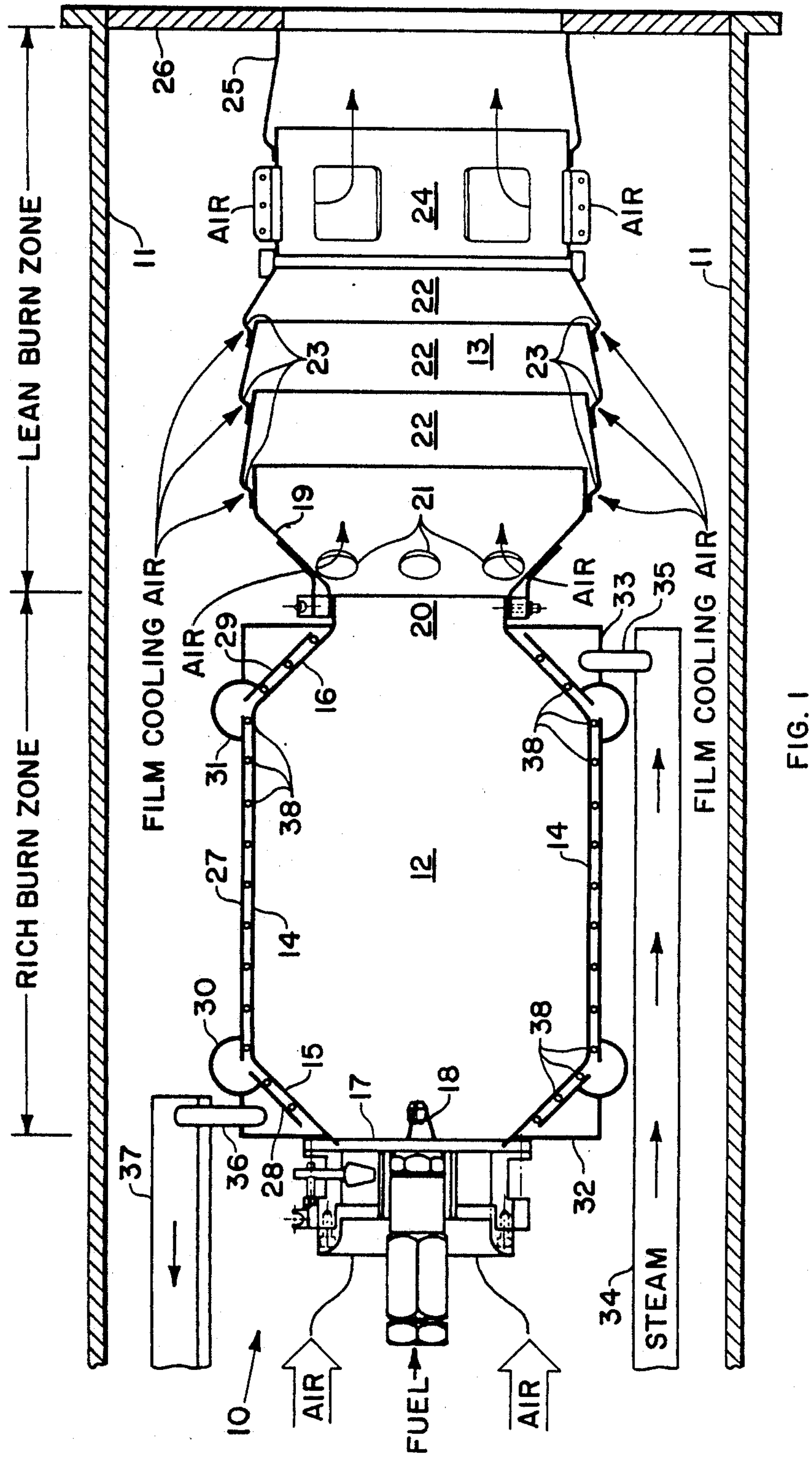
FIG. 1 is a longitudinal section of a combustor embodying the invention.

Referring now to FIG. 1, there is shown a combustor 10 disposed in a housing 11 and comprised of a first combustor section 12 and a second section 13. Section 12 of the combustor 10 is comprised of a cylinder or liner 14 having first and second conical end portions 15 and 16, respectively. The end section 15 is closed by an end wall 17 in which there is supported a fuel injector 18 and in which there are apertures (not shown) through which air is admitted to support combustion of the injected fuel. Adjacent fuel injector 18 is the customary ignitor (not shown).

The conical end section 16 of liner 14 engages the small end of a conical section 19 of the section 13 forming a throat area 20. Apertures 21 are provided in the conical section 19 for the admission of quench air which will mix with the incompletely burned fuel passing from section 12 into section 13.

A plurality of nesting sections 22 are provided downstream of the conical section 19 and admit air at their annular, leading edges 23 to provide film cooling and air for further combustion of the gases exiting section 12 of the combustor.

The last annular ring 22 of section 13 engages an apertured ring 24 which, in turn, engages an end ring 25, the latter extending into an end wall 26 which closes the area between ring 25 and the housing 11, thereby forcing all air entering at the other end of housing 11 to pass through sections 12 or 13.

As discussed previously, the rich burn combustion of fuel injected into section 12 by fuel injector 18 produces extremely high tempertures on the liner 14. Accordingly, to achieve the necessary long life for cylinder 14, it is necessary to maintain its temperature at about 1100° to 1400° F.

To this end, a jacket including a cylindrical wall 27 is disposed coaxially outwardly of the cylindrical liner 14 to establish an annular space. Similarly, annular conical spaces are provided at the ends of section 12 by means of conical jacket walls 28 and 29 which are disposed outwardly of combustor conical end walls 15 and 16, respectively.

The conical outer walls 28 and 29 are spaced apart from cylinder 27 thereby forming a respective pair of annular gaps. These annular gaps are provided to avoid stresses which would be deleterious to the outer jacket cylinder 27 and to the conical jacket sections 28 and 29. The gaps are covered and sealed by respective annular expansion tubes 30 and 31. The outer shell of combustor section 12 is completed by a first annular inlet manifold 33 having a wall which connects expansion joint 31 to the small end of conical section 16 and by a second annular outlet manifold 32 having a wall which connects the expansion joint 30 to the small end of conical section 28.

To cool the cylinder 14 of combustor section 12, steam from a steam line 34 is directed into the annular manifold 33 by means of one or more conduits 35. The steam passes through the annular space between cylinders 14 and 15 and into annular manifold 32. From manifold 32 the steam passes through one or more conduits 36 into a steam exhaust line 37. The cooling steam passes through the annular space between walls 14 and 27 in a plurality of spiral-shaped streams.

To the end that the cooling steam will flow in a plurality of spiral paths, as mentioned above, a plurality of barriers such as wires 38 are wound in spiral fashion around the cylindrical wall 14. Each wire begins at the smallest diameter of the conical wall 29 and ends at the smallest diameter of the conical wall 28.

Figure 2:
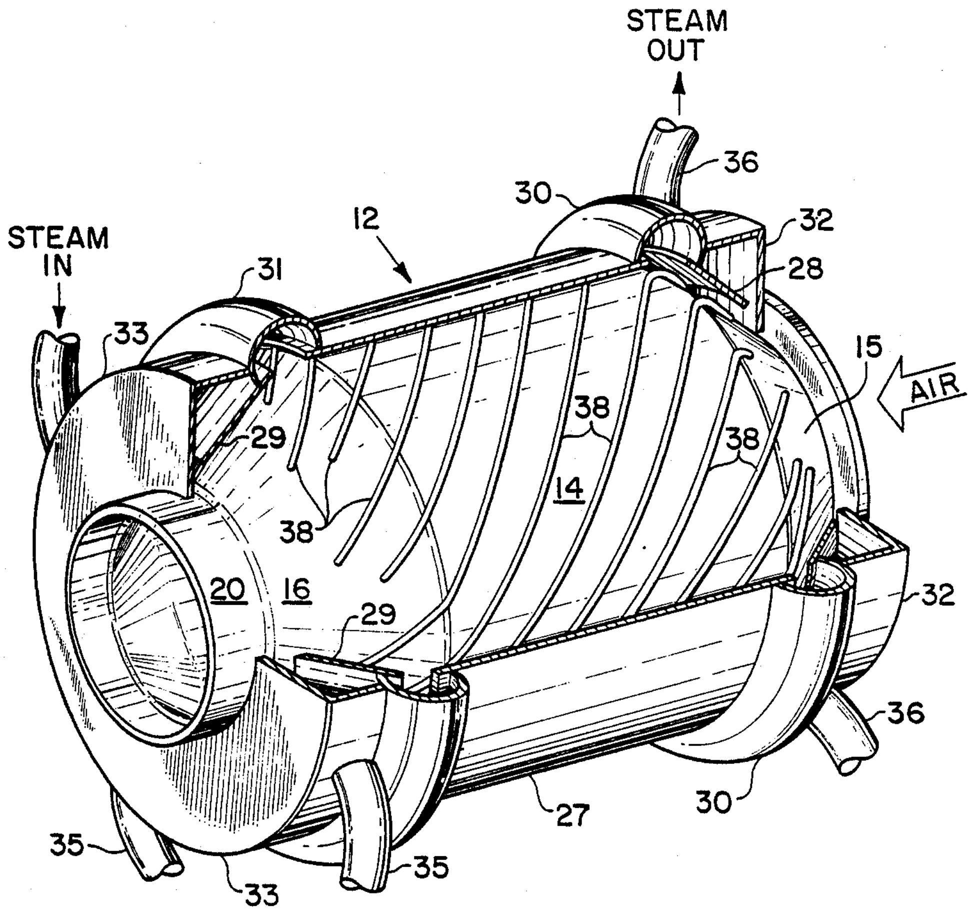
FIG. 2 is a partially cutaway pictorial view of the primary combustor in which rich burn takes place.

Referring now to FIG. 2, there is shown a partially cutaway pictorial view of section 12 of the combustor shown in FIG. 1. Parts in FIG. 2 are identified by numerals corresponding to numerals which identify like parts in FIG. 1.

As shown in FIG. 2, the wires 38 are wound in spiral fashion on the inner cylinder 14. Thus, there are formed a plurality of spiral shaped channels for the flow of cooling steam from manifold 33 to manifold 32. The wires 38 may be brazed or welded to the cylinder 14 and to the conical end sections 15 and 16 with the barriers 38 being attached to the cylindrical liner 14, they will not be in sealing contact with jacket 27 when the rich burn section 12 is not operating. The converse is true when the rich burn section is operating.

The angle of advance of the wires 38 is chosen so that the point at which steam from any channel enters manifold 32 is at an angular position of from about 90° to 270° from where it entered the channel from manifold 33. In other words, the steam flow spirals or rotates through an angle of from 90° to 270° while traversing from one end of section 12 to the other end, with a rotation of about 180° being preferred.

It will, of course, be understood that the direction of the spiral winding of the wires 38 may be reversed. That is, as viewed from the throat 20 along the axis of cylinder 14, rods 38 may be wound in a clockwise rather than a counter-clockwise direction.

Referring again to FIG. 1, it will be seen that steam is delivered to manifold 33 from a steam line 34 via a plurality of connecting pipes 35. To minimize stress on the wall 14 of primary combustor 12, it is desirable to have the steam pressure such that the pressure in manifold 33 is approximately the same as primary combustor discharge pressure at the throat 20. The steam pressure in manifold 33 is typically 175 pounds per square inch absolute (psia) at about 375° F. temperature. It is desirable that the steam temperature be at the saturation temperature for whatever pressure is utilized.

The steam from outlet manifold 33 is superheated and may be advantageously employed to drive many different types of steam driven equipment which would normally have to be supplied from a boiler. Thus, the steam exhaust line 37 is connected to a steam utilization device and the energy extracted from section 12 of combustor 10 is conserved.

It will be understood that changes and modifications may be made to the above-described invention by those skilled in the art without departing from its spirit and scope as set forth in the claims appended hereto.

I claim:

1. A combustor system including a primary rich burn section having a liner and followed by one or more lean burn sections and comprising:

a cylindrical jacket disposed outwardly of said combustor rich burn section liner to form an annular space;

a plurality of barriers disposed in said annular space, each barrier being in the form of a spiral, thereby forming a plurality of spiral passageways;

a first annular manifold disposed at one end of said rich burn section liner adjacent said one lean burn section and communicating with said annular space;

a second annular manifold disposed at the other end of said rich burn section liner and communicating with said annular space; and means for directing steam into said first manifold at a pressure approximately equal to the discharge pressure of said rich burn section, said steam flowing in a plurality of spiral streams through said annular space into said second annular manifold, said barriers being attached to said liner and wherein said jacket does not sealingly contact said barriers when said rich burn section of said combustor is not operating but does when said combustor is operating, and wherein said combustor liner has a first conical section at one end adjacent said one lean burn section and a second conical section at its other end, said jacket including first and second conical jacket sections outside of said first and second combustor liner sections, respectively, said conical jacket sections being separated from said cylindrical jacket section by first and second annular gaps, and first and second annular expansion tubes enclosing said first and second gaps, respectively.

2. The system of claim 1 wherein said steam in said first manifold is at a pressure of about 175 psia and a temperature of about 375° F.

3. The system of claim 1 wherein said barriers spiral at a rate such that each steam is rotated through an angle of from about 90 to about 270 degrees.

4. The system of claim 3 wherein each steam stream is rotated through an angle of about 180°.

5. The system of claim 1 wherein said steam flows at a rate and volume such that said rich-burn section liner is maintained at a temperature of between 1100° and 1400° F., approximately.

6. The system of claim 5 wherein said liner temperature is maintained at approximately 1200° F.

7. The system of claim 1 wherein said combustor liner has a first conical section at one end adjacent said one lean burn section and a second conical section at its other end, said jacket including first and second conical jacket sections outside of said first and second combustor liner sections, respectively, said conical jacket sections being separated from said cylindrical jacket section by first and second annular gaps, and first and second annular expansion tubes enclosing said first and second gaps, respectively.

* * * * *